INVENTOR
GEORGES R. P. MARIE
BY
Abraham A. Saffitz
ATTORNEY

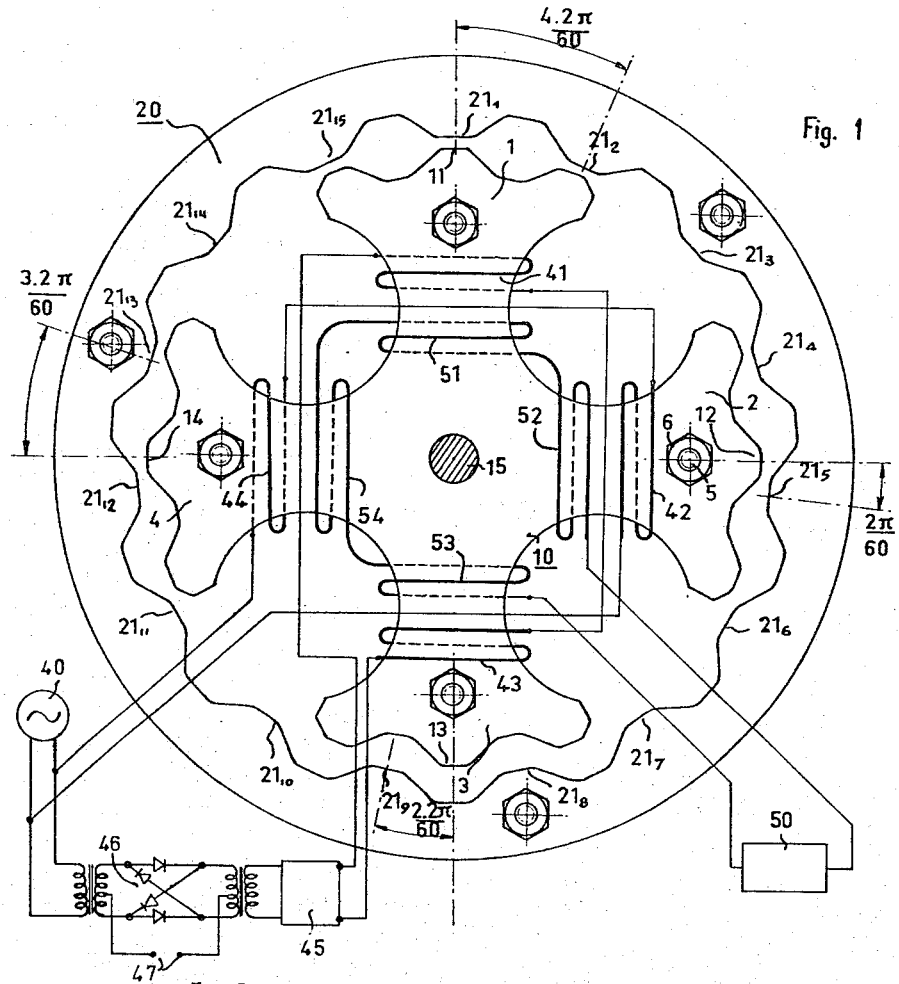

United States Patent Office 3,355,648
Patented Nov. 28, 1967

3,355,648
SLOW SPEED ELECTRIC MOTOR
Georges Robert Pierre Marie, 16 Rue de Varize,
Paris, France
Filed Sept. 9, 1965, Ser. No. 486,050
5 Claims. (Cl. 318—222)

This invention relates to very slow speed electric motors.

The electric motors normally used as servo motors rotate so fast that they are, as a rule, coupled with the regulated element via a speed reduction gear. As well as having its own inertia, the reduction gear multiplies the motor's moment of inertia by the square of the reduction gear demultiplication ratio and thus often causes overshoot of the regulated element.

It is an object of this invention to provide a slow-running electric motor.

A main feature of the motors in accordance with this invention is that, on the one hand, a completely unwound rotor and, on the other hand, the stator poles are formed opposite one another with series of equi-angularly distributed projections and recesses so that, on the assumption that the rotor is stationary, the consecutive projections of the rotor become progressively offset from the projections of the stator poles until, when the progressive offset has become equal to the angle included by the axes of two consecutive rotor projections, the relative position of the rotor projections and of the stator pole projections has returned to its initial state, for a pole system corresponding to one spatial complete electric period.

If M is the number of spatial electric periods of the stator and P is the number of poles per spatial period and N is the total number of teeth (or more generally of magnetic periods) of the rotor, the quotient $N/M$ is an integer differing by one unit from a whole multiple of the number P:

$$N/M = kP \pm 1 \qquad (1)$$

$k$ being an integer.

As a rule, each pole is provided with two windings—a field excitation winding or circuit and an induced voltage winding or circuit. A supply current of frequency $f_1$ flows in the excitation circuit and is such that consecutive poles are energized with a between-poles phase shift increment of $\varphi_1$; the second circuit, in which an induced current of frequency $f_2$ flows, is such that the consecutive poles are energized with a between-poles phase shift increment of $\varphi_2$ for rotation to the same hand as for the $\varphi_1$ increment.

$\varphi_1$ and $\varphi_2$ are connected with the number P of poles per spatial electric period by the relationships:

$$P\varphi_1 = P\varphi_2 \pm 2\pi = 2Q\pi$$

The values of $\varphi_1$ and $\varphi_2$ can be deduced from this as follows:

$$\varphi_1 = \frac{2Q}{P}$$

$$\varphi_2 = \frac{2(Q \pm 1)}{P}$$

The field windings of the poles are energized at the frequency $f_1$ through appropriate phase shifters. The induced voltage windings are terminated by a passive impedance which is generally a short circuit, and are flowed through by induced currents of frequency $f_2$ so that:

$$f_2 = f_1 - NF \qquad (2)$$

F denoting the frequency of motor rotation.

In connection with induced winding construction, if a single wire extends consecutively around a number of poles and is terminated by a given impedance, the current which flows through the wire being the same throughout, the magnetic excitation which such wire produces of a given pole is in absolute value proportional to the number of turns, and whether the magnetic excitation is orientated towards the center or towards the outside depends upon the direction in which the wire is wound around the pole. In the commonest case the induced voltage circuit can be formed by two wires; one of them is wound around consecutive poles with a number of turns corresponding to cos $q\varphi_2$, $q$ denoting the rank of the pole, the winding direction corresponding to the sign of the cosine, and the other wire is wound around consecutive poles with a number of turns proportional to sin $q\varphi_2$, the winding direction corresponding to the sign of the sine. These two windings will be termed respectively the cosine and sine windings. It can be shown that if the teeth of the rotor were in the same relative position with the teeth of all the stator poles, the current induced in the cosine windings serially connected and in the sine windings serially connected would be both zero. Due to the fact that the coupling with the rotor teeth varies from one pole to another, the currents in the cosine windings serially connected and in the sine windings serially connected have non-zero values and are in phase-quadrature to one another.

To make it clear how the induced circuits are wound from two wires, I shall consider a three-phase motor in which:

$$P = 6 \text{ and } Q = 1$$

(consequently there are two spatial periods per complete revolution of the rotor). Therefore:

$$\varphi_1 = \pi/3 \text{ and } \varphi_2 = 2\pi/3$$

If the six consecutive poles are called I, II, III, IV, V, VI, one can take as values of cos $q\varphi_2$ ($q = 0, 1, 2$)

$$1, -\frac{1}{2}, -\frac{1}{2}$$

respectively, and as values of sin $q\varphi_2$.

$$0, 3/2, -3/2$$

respectively.

The first wire is therefore wound around poles I, II, III, IV, V, VI with half the number of turns around poles II, III, V, VI as that with which it is wound around poles I and IV and the direction of winding around poles I and IV being opposite to the direction of winding around poles II, III, V, VI. The second wire is not wound around poles I and IV but is wound around poles II, III, V, VI with equal number of turns, but wound in one direction around poles II and V and in the other direction around III and VI.

Instead of forming the windings with two wires, it is possible and preferred when the number of poles per spatial period of the stator is a multiple of three, to give to the windings a three-phase arrangement. This can be done in the example described by winding a first wire around poles II, III, V and VI (in one direction around poles II and V and in the other around poles III and VI), a second wire around poles III, IV, VI and I (in one direction around poles III and VI and in the other around poles IV and I), and a third wire around poles IV, V, I and III (in one direction around poles IV and I and in the other around poles V and III). All the windings have the same number of turns. The result is therefore three identical induced circuits in which the induced currents form a balanced three-phase system. The three induced voltage circuits of the system just outlined can be terminated by three identical impedances which are, in the general case, short circuits but which can be a second motor in accordance with the invention, as will be described hereinafter.

A particular case arises when $\varphi_2$ is equal to zero or $\pi$, for sin $q\varphi_2$ is then always zero and the induced voltage circuit can be embodied with a single wire. When $\varphi_2$ is zero, it may be difficult to complete the magnetic field circuit, and so the case in which $\varphi_2$ is equal to $\pi$ is the most interesting and will be studied in greater detail hereinafter.

As the motor approaches synchronism, defined by a speed of rotation equal to $f_1/N$, the frequency $f_2$ and the induced current tend towards zero. Consequently, if the motor is to operate as a synchronous motor, the external load terminating the induced voltage windings must be replaced by a D.C. source producing a D.C. in the latter windings. In a variant of the invention, the A.C. source of frequency $f_1$ can be replaced by a D.C. source which is switched either by means of a collector connected to the rotor or by electronic means. As will be seen hereinafter, the induced voltage windings can be omitted in cases where the field armature current, instead of being a sine current or a D.C. bidirectional current which can have two opposite values, is a unidirectional current which can have either a given value or a zero value.

The invention also relates to arrangements comprising a number of cascade-connected motors according to the invention.

According to relationships given by Manley and Rowe, in the absence of hysteresis, eddy currents and ohmic losses apart from those in the load resistances of the induced voltage circuits, the mechanical output power is a fraction $NF/f_1$ of the electrical input power. If the induced voltage winding resistances are zero and the load resistances are just the input resistances of the second motor, on the basis of Formula 2 the proportion of the input power transmitted to the second motor is $f_2/f_1$. If the secnd motor is identical to, and rotates as the same speed as, the first motor, the second motor converts into mechanical power a further proportion $NF/f_2$ of its electrical input; its mechanical output is therefore equal to the mechanical output of the first motor and it produces in its induced voltage windings a current of frequency $f_3$:

$$f_3 = f_2 - NF = f_1 - 2NF \quad (3)$$

whose power is a proportion $f_3/f_1$ of the initial input power. This current can supply a third motor, and so until the frequency delivered by the induced voltage circuit of the final motor is below $NF$; the remaining power must be consumed in a resistance which is the resistance of the induced voltage windings of the final motor if the latter winding circuit is short-circuited. This residual power can be very small. If the frequency of the current delivered by the penultimate motor is $NF$, the final motor running at the frequency $F$ can operate as a synchronous motor, in which event all the electrical inputs to all the motors can in theory be converted into mechanical power.

In cases where a number of identical motors are all compelled to run at the same frequency $F$, the maximum number of motors which can be cascade-connected depends upon $F$ and is equal to the number of times that $NF$ goes into $f_1$. If this number of times is $A$, the maximum theoretical efficiency is $ANF/f_1$. If the number of motors is given and if the frequency $F$ varies, the number of motors which can be connected in cascade decreases as the frequency $F$ increases, but any motors disconnected from the cascade can be connected in parallel. A switch providing this kind of changeover will be described hereinafter.

In a variant, a single toothed ring can form a rotor common to a number of motors whose stators are different pole systems formed in a single magnetic group. For instance, assuming that we have a group of high-permeability laminations cut to form 24 identical poles in four rows of six poles, the wire can be wound to form 4 different motors each having 6 poles, and these motors can be changed over so as to be connected either in cascade, when $F<f_1/4N$, or to form two cascaded-parallel systems when $F<f_1/2N$, or so as to be connected all four in parallel at higher speeds, $F$ being less than $f_1/N$.

The invention will be better understood from a study of the following detailed description with reference to the accompanying drawings wherein:

FIG. 1 shows a first embodiment of a motor according to the invention;

FIGS. 2 and 3 are field diagrams showing the direction of the fields produced by the two windings disposed on each pole;

Figure 4:
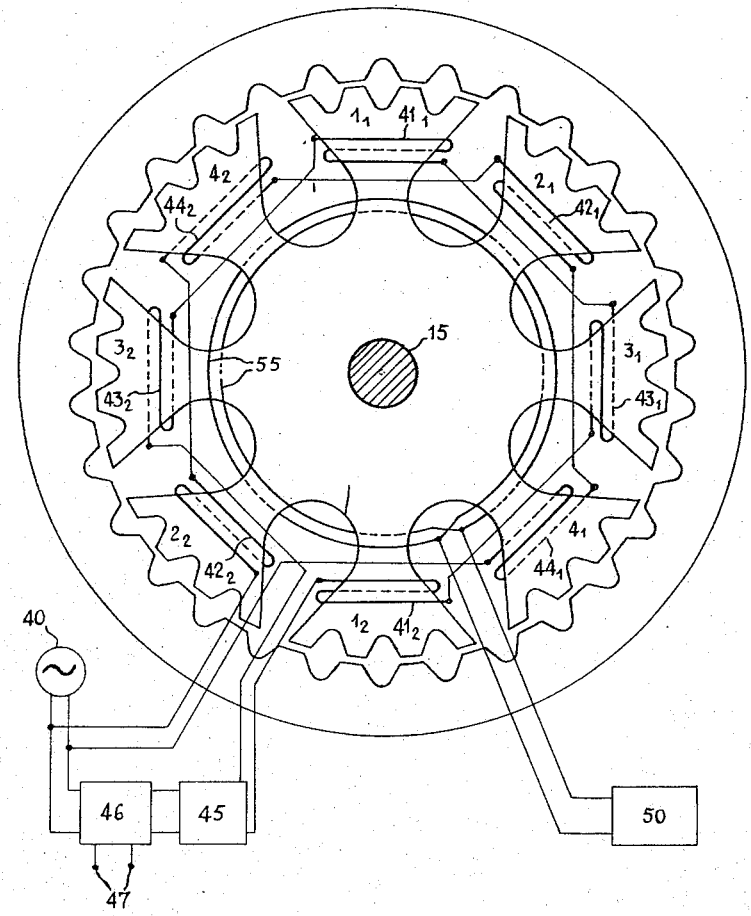
FIG. 4 is a diagrammatic view of a motor according to the invention wherein the offset between rotor teeth and stator pole teeth comes to one tooth spacing in half a revolution.

Referring to FIG. 1, a motor comprises a rotor 20 and a stator 10 having four poles 1–4. The stator and rotor are each formed by groups of high-magnetic-permeability laminations which can either be interconnected by bolts or screws or the like 5 and nuts 6 or, and preferably, bonded together. The rotor has a spindle 15. The rotor extends around the stator, to facilitate the positioning of the windings shown in the form of single turns, the wire being shown in solid line in places where it is in front of the stator and in broken line in places where it is behind the stator. The rotor 20 has 15 evenly spaced teeth $21_1$ to $21_{15}$; the between-axis distance for any two consecutive teeth is therefore $2\pi/15$.

Each of the four stator poles has three teeth which are also at a between-axis spacing of $2\pi/15$ and which will temporarily be assumed to be, like the rotor teeth, symmetrical of their axes. The teeth which are disposed on the pole axes have the references 11–14. As can be seen in FIG. 1, the offset between the axes of the teeth 11 and $21_1$ is zero, the offset between the axes of the teeth 12 and $21_5$ is $2\pi/4N$, the offset between the axes of the teeth 13 and $21_9$ is $2\times 2\pi/4N$, the offset between the axes of the teeth 14 and $21_{13}$ is $3\times 2\pi/4N$ and the offset between the axes of the teeth 11 and $21_2$ is $4\times 2\pi/4N$. Consequently, since the rotor is in a position such that its teeth are exactly opposite the teeth 11 of the pole 1, the air-gap surface is at a maximum for the pole 1. On the other hand, in the case of the pole 3 the corresponding rotor teeth are offset by half a spatial period and are therefore opposite the stator recesses, and the effective air-gap surface is at its minimum and can be considered to be zero. In the case of the poles 2 and 4, the respective rotor teeth are offset by one-quarter of a period in relation to the positions just described and the air-gap surface is at some value intermediate its maximum and its minimum values; if the currents energizing the poles 2 and 4 produce a magnetic field which is stronger near the pole 2 than near the pole 4, the air-gap of the pole 2 will tend to increase its effective surface and the air-gap of the pole 4 will tend to decrease its effective surface, so that a torque is produced which rotates the motor. The asymmetrical relationship of the currents energizing the poles 2 and 4 is the result of the way in which the windings are contrived.

The current of frequency $f_1$ is produced by a source 40. The same energizes field windings 42, 44 respectively which produce a magnetic field indicated by broken-line arrows 62, 64 in FIG. 2. Via a $\pi/2$ ($\varphi_1=/2$) phase-shifter 45, the source 40 also supplies field windings 41, 43 which produce a magnetic field $\pi/2$ out of phase with the field produced by the windings 42–44; the field associated with the windings 41, 43 is indicated by solid-line arrows 61, 63 in FIG. 2. Since the current flows one way through winding 41 and the opposite way through winding 43 and also flows one way through winding 42 and the opposite way through winding 44, the fields represented by the arrows 61–64 have respective phase shifts of $\pi/2$ from any one pole to the next.

The induced voltage windings 51–54 are connected in series and are terminated by a load 50 in the form of an impedance which can be a short circuit. The direction of winding of the windings 51–54 is such that the magnetic field which they produce is as indicated by arrows 71–74 in FIG. 3. The phase-shift $\varphi_2$ between any two consecutive poles is therefore $\pi$ in this case.

When the motor is used as a servo motor, a ring modulator 46 is interposed between the source 40 and the phase-shifter 45 and has the actuating signal applied to its input terminals 47. When the motor is used as a synchronous motor, the modulator 46 is omitted and a D.C. source replaces the impedance 50.

When the relative position of the rotor 20 and stator 10 is as shown in FIG. 1, this figure is symmetrical of a vertical axis. The air-gaps between the poles 2, 4 and the corresponding rotor teeth are equal; the inductances of the windings 42, 44 are equal and their mutual inductances with the windings 52, 54 are equal. The voltages which they induce in the windings 52 and 54 are equal and opposite and cancel one another out. On the other hand, the air-gap between the pole 1 and the rotor is at a minimum and the air-gap between the pole 2 and the rotor is at a maximum. The voltage induced by the winding 41 in the winding 51 is much greater than the voltage induced by the winding 43 in the winding 53. The windings 51, 53 act as a differential transformer. A current of frequency $f_2$ therefore flows in the induced voltage circuit and its strength can be varied by adjustment of the load impedance 50. The latter current produces a magnetic field which increases the field already produced by the winding 42 in the pole 2 and decreases the field produced by the winding 44 in the pole 4. The attraction between the teeth 12 and $21_5$ therefore increases and the attraction between the teeth 14 and $21_{12}$ decreases, to produce a torque which rotates the motor. When the tooth 12 is opposite the tooth $21_5$ and the tooth 14 is opposite the tooth space between the teeth $21_{12}$ and $21_{13}$, the motor is symmetrical around the straight line connecting the center of the tooth $21_5$ to the center of the tooth space between the teeth $21_{12}$ and $21_{13}$, and the reasoning just given in respect of the vertical axis can be made of the axis formed by the straight line just mentioned.

FIG. 4 diagrammatically illustrates a motor comprising two complete electrical periods. The poles $1_1$, $2_1$, $3_1$, $4_1$ on the one hand, and $1_2$, $2_2$, $3_2$, $4_2$ on the other hand, do the same job at the same time and form the two electrical periods of the stator. The windings $41_1$, $42_1$, $43_1$, $44_1$ and $41_2$, $42_2$, $43_2$, $44_2$ of these poles perform exactly the same respective job as the windings 41–44 of FIG. 1. Elements doing the same job in FIG. 4 as in FIG. 1 have the same reference numerals: the power source 40, modulator 46, phase-shifter 45 and terminating impedance 50 for the induced voltage windings. The induced voltage circuit is so devised that consecutive poles are energized with the same strength of current but alternately in opposite senses since, as in FIG. 1, $\varphi_2=\pi$. The reason for this is that the rotor has 30 teeth ($N=30$), and the stator has two electrical periods ($M=2$) and four poles per period ($P=4$). Relationship (1) is fully borne out. The phase shift between energizing currents of any two consecutive poles is $\pi/2$ and is provided by the phase shifter 45. The advantage of the motor shown in FIG. 4 over the motor shown in FIG. 1 is that in the motor shown in FIG. 4 transverse forces acting on the axis cancel one another out.

Figure 5:
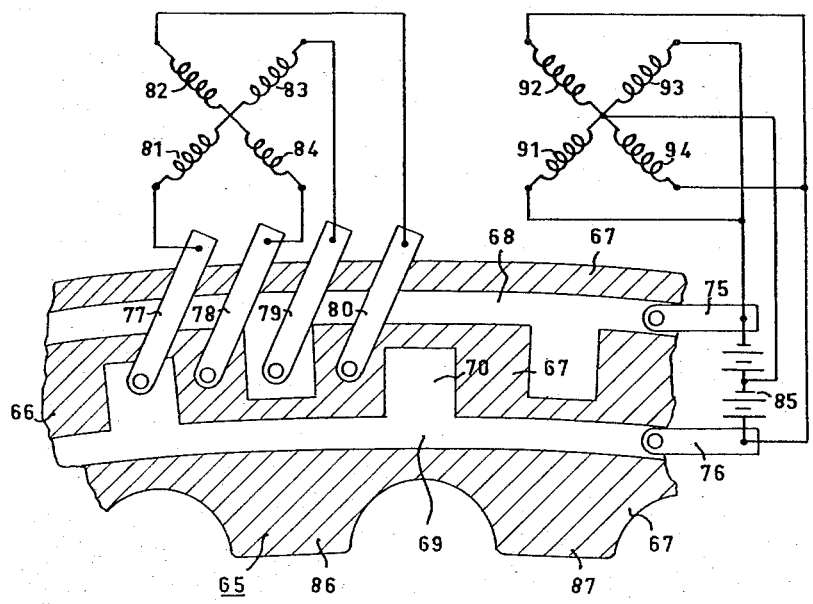
FIG. 5 shows a second form of motor according to the invention with D.C. supply and comprising a collector.

FIG. 5 shows a portion of a rotor 65 whose lateral surface 66 has been coated with an insulating substance 67 having two conductive tracks 68, 69 printed in it. The two tracks have studs or castellations or the like 70 the edges of which interlace with one another as shown. A D.C. source 85 supplies the tracks via two brushes 75, 76. The stator of this embodiment has four poles (not shown) receiving field windings 81–84 and induced voltage windings 91–94. The D.C. source 85 supplies the windings 91–94; it is assumed that the motor is a synchronous one. Brushes 77–80 are connected to the windings 81–84 which provide the rotating magnetic field; the brushes rub on the studs 70 which electrically form part of the tracks and which follow one another at the same periodicity as the rotor teeth. Two rotor teeth 86, 87 are shown. In the embodiment shown in FIG. 5, the brushes 77, 79 apply the source voltage to the terminals of the windings 81, 83, but the brushes 78, 80 rub on the insulator and so no current flows through the windings 82, 84. If the rotor rotates through a quarter of a spatial period—i.e., through one-quarter of the angle between the axes of any two consecutive teeth—the brushes 78, 80 supply the windings 82, 84 and the current to the windings 81, 83 is interrupted. When the rotor rotates through another quarter of a spatial period, the current through the windings 82, 84 is interrupted and current flows through the windings 81, 83 but in the opposite direction to the direction in which it was initially flowing in FIG. 5. When the rotor advances by one tooth, the current in any stator pole changes from one value to an equal and opposite value, then returns to the initial value. This provides the switching effect enabling the motor when supplied with D.C. to rotate on the basis of an operation exactly the same as described with reference to FIG. 1 for A.C. operation.

Figure 6:
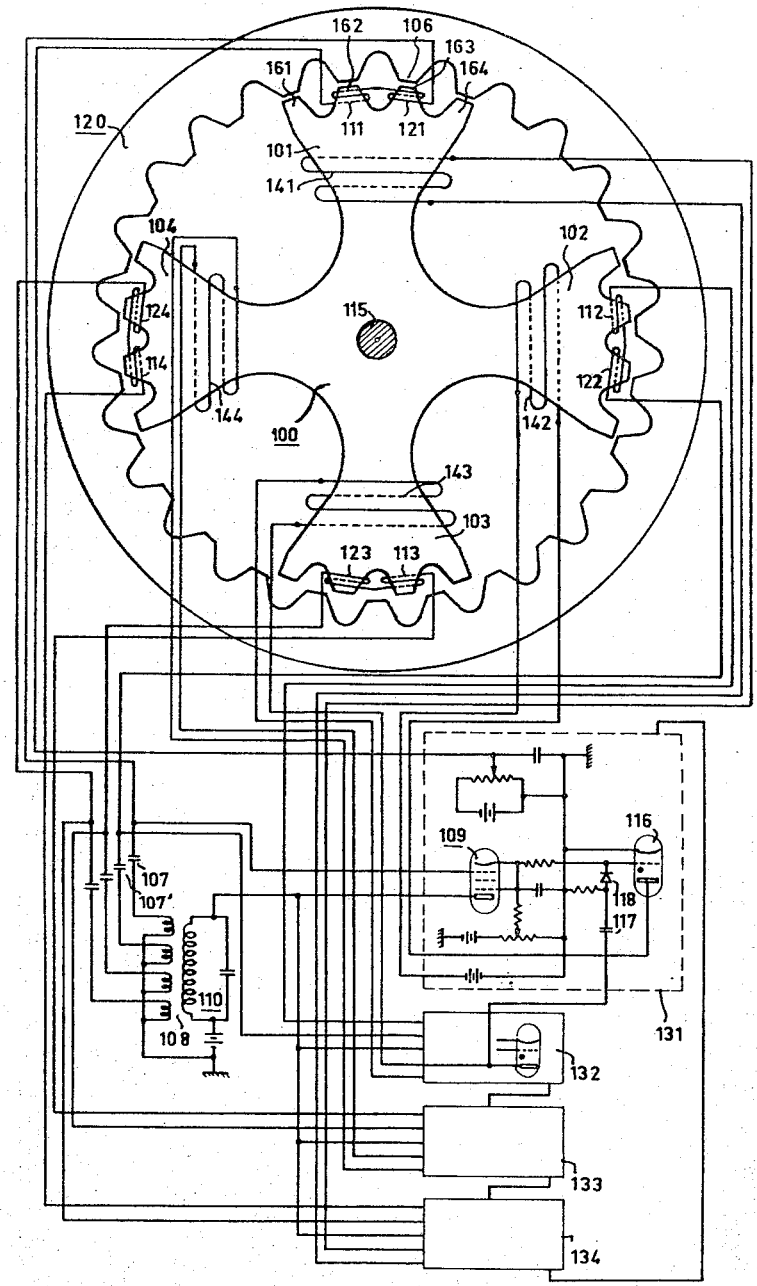
FIG. 6 shows a third form of motor according to the invention with D.C. supply and an electronic changeover device.

Referring to FIG. 6, there can be seen a rotor 120, a rotor shaft 115, a stator 100 and four stator poles 101–104. In this embodiment each pole has a single winding 141–144 respectively and also switching control windings 111–121 to 114–124 on respective poles, each control winding being in two parts respectively engaging the middle two teeth formed on each pole tip. The two windings 111 and 121 belonging to two consecutive teeth of any one pole are identical but wound oppositely and are connected in series to the input of a control circuit 131 to 134 respectively. The same are identical; only one, 131, is shown in detail, the other three being shown in block form.

In the embodiments shown in FIGS. 1 and 5, the currents flowing through any two windings associated with a single pole, such as 41 and 51 in FIG. 1, or 81 and 91 in FIG. 5, were alternating, i.e., bidirectional currents and produced magnetic fields which alternately boosted one another, then cancelled one another out. With the electronic control circuit now to be described, since the current flowing through the windings 141–144 is zero or has a predetermined direction, as will be apparent, i.e., the current is unidirectional, the induced voltage windings then cease to be necessary and are therefore not provided. Since the two windings 111, 121 are identical and wound oppositely, no current flows through them when there is a homogeneous flux variation at the pole 101. However, the self-inductance of the windings varies with the position of the rotor teeth, being at a maximum when the teeth of the rotor 105 are opposite the teeth of the rotor 106 (case of the pole 101 in FIG. 6). The windings 111–121 are all connected in series with capacitor 107 so as to form a series resonant circuit tuned, when the windings have their maximum self-inductance, to a frequency which is very high relatively to the frequency at which the rotor teeth pass by a stator tooth. The series-tuned circuits associated with the four poles are loosely coupled with an oscillating circuit 110 tuned to the same frequency as themselves when their self-inductance is maximum, the circuit 110 being connected in the anode circuit of a pentode tube 109. The control grid thereof is so biased that current flows through the tube 109 only when its grid swings strongly, as occurs when the capacitor 107 co-operates with the inductance of the windings 111, 121 to resonate at the frequency defined by the circuit 110. The cathode of tube 109 then becomes positive; the cathode is connected to the grid of a thyratron tube 116 in whose anode circuit the winding 142 of the pole 102 is connected. The anode of the thyratron of a switching control circuit, 132 for instance corresponding to the pole 102, is connected to the grid of the thyratron for the immediately previous pole via a capacitor 117 and rectifier 118.

The electronic switching control system operates as follows:

When the inductance of the windings 111, 121 is such that the circuit 111, 121, 107 resonates at the frequency of the circuit 110, the tube 109 triggers the thyratron 116 and the same energizes the winding 142. When the thyratron in the circuit of the winding 143 fires, it cuts off the circuit of the thyratron in the circuit of the winding 142. The system has then rotated through one quarter of a period of the rotor; the windings 112, 122 start to resonate with their tuning capacitor 107' and the cycle just described repeats.

The circuit 110 is loosely and identically coupled with all the detecting windings 111 and 121, 112 and 122, 113 and 123 and 114 and 124. Only any single one of these detecting windings resonates at any one time, and so the four anodes of the four detecting pentodes can be connected in parallel to the circuit 110, the oscillations being of course maintained therein by the particular pentode through which a current happens to be flowing.

It has so far been assumed that the stator teeth have the same spacing as the rotor teeth and, like the latter, are symmetrical of evenly spaced axes. A description will now be given of the arrangement of the stator teeth on the poles.

Figure 7:
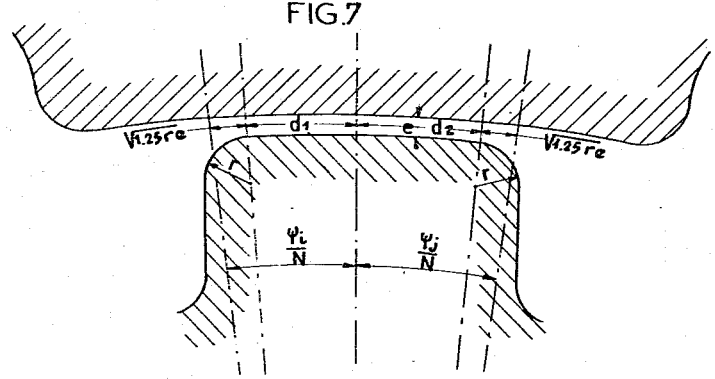
FIGS. 7 and 8 are diagrammatic views to show how the shape of the stator pole teeth is determined.

In order to be able to neglect the edge effect of the stator pole teeth in the following description, it can be assumed (FIG. 7) that the edge effect is equivalent to a prolongation of the peripheral development of the tooth equal to $\sqrt{1.25\ re}$, $r$ denoting the radius of the rounded boundary of the tooth profile and $e$ denoting air-gap thickness (this formula assumes that $r$ is equal to or greater than $2e$). If the peripheral length of the stator tooth as far as the beginning of the lateral roundings is $2d$, corresponding to an angular development of $2d/R$, R denoting the stator radius, the theoretical length which must be used in calculation is $(2d+2\sqrt{1.25\ re})$, corresponding to a theoretical angular development of $$2(d+\sqrt{1.25\ re})/R$$

referred to hereinafter as $2\psi/N$. Actually, as will be seen, the stator pole teeth are not symmetrical, and in relation to the axes of the teeth which will be called the main axes and which will be defined hereinafter, one will have to consider an angular development $\psi_i/N$ to the left of the main axis and an angular development $\psi_j/N$ to the right of said main axis. The actual dimensions of the tooth can be deduced readily from these left and right theoretical angular developments. For instance, if $$\psi_i/N = 31°/15 \qquad \psi_j/N = 83°/15$$

and if:

$e = 0.1$ mm.
$r = 1$ mm.
$R = 60$ mm.

therefore:

$d_1$ (to the left of the main axis) $= 1.75$ mm.
$d_2$ (to the right of the main axis) $= 5.44$ mm.

The following calculations are therefore based on the theoretical angular developments. For the rotor whose teeth are symmetrical, these angular developments are equal to $\pi/2N$ on either side of the axes of symmetry of the teeth. For the poles they are defined from the main axes which are in turn defined as being evenly spaced by $2\pi/N$ and forming a symmetrical system relatively to the pole axis. The same has the reference 800 in FIG. 8, references 801–804 denoting the main axes of the four teeth of the pole.

When the edge of a rotor tooth scans along the length of a pole tooth, the air-gap length for the latter tooth varies in proportion to the angle of rotor rotation. The air-gap length stays constant at its maximum value, which is the length of the stator tooth, while the edges of a rotor tooth frame the pole tooth, and must be considered substantially zero when the rotor teeth pass by the tooth spaces on either side of the particular stator pole tooth concerned. If one considers the development of the tooth in a direction perpendicular to the plane of FIG. 8, the term "length" must be replaced by "surface." The limit angles of the rotor teeth must be such that for a given pole the sum of tooth lengths which are situated under the rotor teeth and which vary individually as just described, is a good approximation to a sine function.

Figure 8:
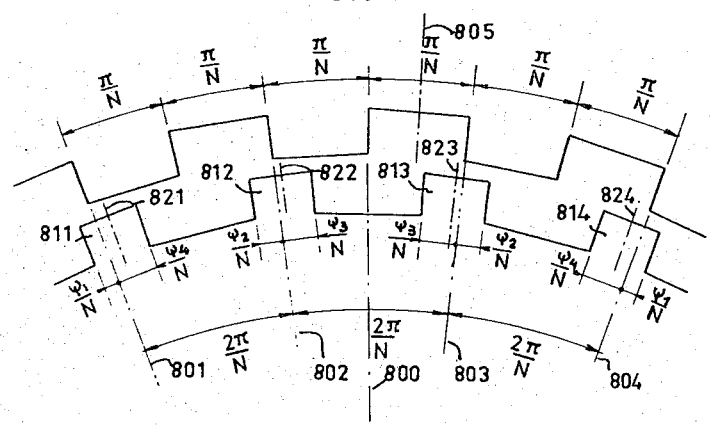

Let $p$ denote the number of teeth of a pole and $\psi_1$, $\psi_2 \ldots \psi_i \ldots \psi_p$ denote the values multiplied by N of the limit angles arranged in increasing order without prejudice to the position of the tooth to which they refer. Since the main axes of the teeth of any one pole are spaced apart by $2\pi/N$ one can take as initial time the time when the effective edges of the rotor teeth are on the latter main axes, as is shown in FIG. 8. The function representing the air-gap surface variation is then an odd function of the angle of rotor rotation. When the rotor rotates from this initial position through an angle $\psi_1/N$, the rotor tooth edges sweep the $p$ teeth of the pole, but when, as the rotor continues to rotate, its tooth edges pass from the angle $\psi_i/N$ to the angle $\psi_{i+1}/N$, they sweep only $(p-i)$ pole teeth and the variation in air-gap length during this sweep is proportional to $(p-i)(\psi_{i+1}-\psi_i)$, with a sign depending upon the hand of rotation. Matters must be so devised that this variation is proportional to $(\sin\psi_{i+1} - \sin\psi_i)$, the sine function being, like the linear variations in length, odd relatively to the $\psi$ terms. This leads to the proportionality relationship:

$$\sin\psi_{i+1} - \sin\psi_i = (1+\epsilon)\frac{p-i}{p}(\psi_{i+1} - \psi_i) \qquad (4)$$

Since the proportionality factor $(1+\epsilon)/p$ is determined by the fact that during the sweep from 0 to $\psi_1/N$ (which corresponds to the condition $i=0$), one has:

$$\sin \psi_1 = (1+\epsilon)\psi_1 \qquad (4')$$

Clearly $\epsilon$ is an infinitely small second-order factor relatively to $\psi_1$.

Converting the sine sum of Formula 4 into a product, one obtains the relationship:

$$\cos\frac{\psi_{i+1}+\psi_i}{2} = (1+\epsilon)\frac{p-i}{p}\frac{\frac{\psi_{i+1}-\psi_i}{2}}{\sin\frac{\psi_{i+1}-\psi_i}{2}} \qquad (5)$$

As a first approximation and neglecting the infinitely small second-order values relatively to $(\psi_{i+1}-\psi_i)/2$, assumed to be a first-order term, one can write:

$$\psi_{i+1} - \psi_i = 2\cos^{-1}\left(1-\frac{i}{p}\right) \qquad (6)$$

so that only there are $p-1$) equations to determine the $p$ values of the $\psi_i$ terms.

To have a $p^{\text{th}}$ equation, a further condition can be imposed, such as that $\psi_1$ and $\psi_2$ are equal or that the step during which the function approximating the sine function stays constant has the same duration as the linear growth and decay steps on either side. This can be written as:

$$2\left(\frac{\pi}{2}-\psi_\text{D}\right)=\psi_\text{D}-\psi_{\text{D}-1}$$

For a four-toothed pole such as the one shown in FIG. 8, this gives the following system of equations:

$$\left.\begin{array}{l}\psi_2+\psi_1=2\cos^{-1}(1-\tfrac{1}{4})=\phantom{0}83°\\ \psi_3+\psi_2=2\cos^{-1}(1-\tfrac{1}{2})=120°\\ \psi_4+\psi_3=2\cos^{-1}(1-\tfrac{3}{4})=150°\\ 2(90-\psi_4)=\psi_4-\psi_3\end{array}\right\} \quad (7)$$

which resolves to:

$\psi_1=31°$
$\psi_2=52°$
$\psi_3=68°$
$\psi_4=83°$

A second approximation could be obtained by carrying these angles over into the second term of Formula 4 and by a new resolution but the calculation will stop there. The limit angles thus calculated are placed, relatively to the main axes, as shown in FIG. 8, with the relatively small angles at the outside so that the pole system is very narrow. If matters are so contrived that the $\psi$ terms on the row. If matters are so contrived that the $\psi$ terms on the left of the main axes increase in proportion as the $\psi$ terms to the right of the main axes decrease, teeth of similar widths are obtained. In the example just taken, one finds:

$(\psi_1+\psi_4)/N=114°/N$
$(\psi_2+\psi_3)/N=120°/N$

These conditions are not essential (the $\psi_1$ terms can be arranged at will relatively to the teeth) but are desirable for satisfactory distribution of the magnetic field and in order to be able to control the triggering phase of the electronic device which controls the current in the field windings in FIG. 6. In the example shown in FIG. 8, the axes of symmetry 821, 824 of the end teeth 811, 814 are offset by $26/N$ degrees towards the center relatively to their main axes 801, 804, and the axes of symmetry 822, 823 of the teeth 812, 813 relatively near the center are ofset by $8/N$ degrees towards the center relatively to their main axes 802, 803. Consequently, according as to whether the two serially connected windings 111, 121 whose self-inductance is being measured are associated with two teeth which are symmetrical of the pole axis, as 812 and 813, or with two teeth disposed on the same side of the latter axis and, in relation to the hand of rotation, downstream, as 813 and 814, or upstream, as 811 and 812, the self-inductance is at a maximum when the axis of symmetry 805 of a rotor tooth space passes by the axis of symmetry 805 of a rotor tooth space passes by the axis of symmetry 800 of the pole with either a lead or lag on the time of passing corresponding to a mean angular offset of $\pm(26+8)/2N$ degrees—i.e., approximately $\tfrac{1}{22}$ of a period. Mean angular offsets of $\pm(26-8)/N$ degrees—i.e., approximately $\tfrac{1}{40}$ of a period—can be obtained by the wire extending around an end tooth on one side—811 and 814 respectively—and a central tooth on the other side—813, 812 respectively.

Figure 9:
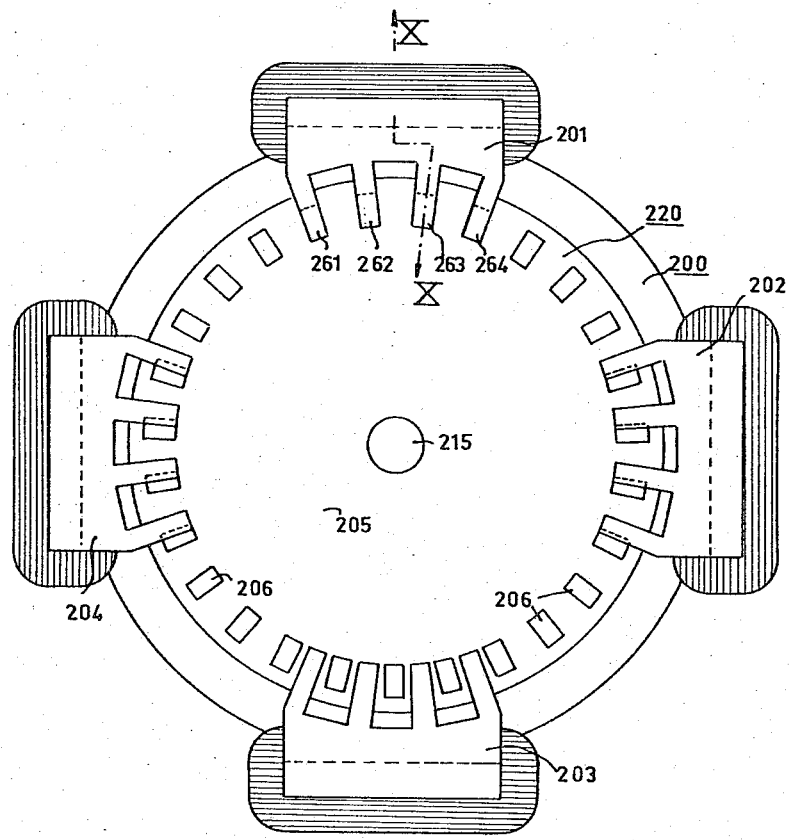
FIGS. 9 and 10 show a fourth form of motor according to the invention, the magnetic field being axial instead of radial.
Figure 10:
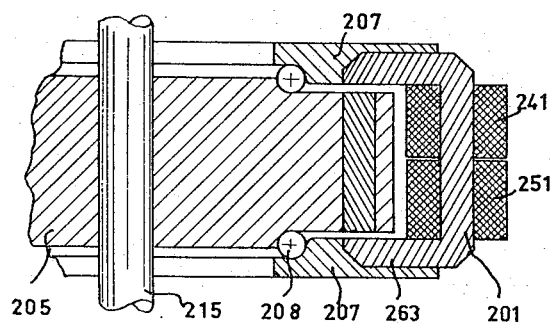

FIGS. 9 and 10 show the rotor, pole pieces and windings of a motor which operates similarly to the motor shown in FIG. 1 except that the magnetic field is axial instead of radial. A rotor 220 rotating around its half 215 comprises a non-magnetic disc 205 fitted with high-magnetic-permeability metal blocks 206 which extend transversely and parallel to the motor shaft and are distributed equally near the rotor edge. A stator 200 has poles 201–204 in the shape of a U, the U arms having extensions 261, 264 acting similarly to the teeth 161–164 of FIG. 6. FIG. 9 shows that when the extensions 261–264 on the pole 201 are opposite the rotor block 206, the extensions of the pole 203 come between the blocks 206 and the extensions of the poles 202, 204 are in an intermediate position. The poles and their extensions are embedded in non-magnetic discs 207 which are shown sectioned in FIG. 10. Also visible therein, between the discs 205 and 207, are anti-friction bearings 208 separating the rotor from the stator.

In order to have the air-gap surface varying sinusoidally in dependence upon the angle of rotor rotation, exactly the same procedure is used as was used in FIG. 8; the angular widths of the blocks 206 are $\pi/N$ and the extensions of the pole branches are determined as an angular value like the stator pole teeth in FIG. 8. All the kinds of operation hereinbefore described are applicable in the cases shown in FIGS. 9 and 10, namely A.C. operation with doubly phase-shifted circuits, D.C. operation with D.C.-A.C. converter collector or electronic switch or even A.C. operation with permanent magnetisation replacing the action of D.C. current flowing through the induced voltage windings. The windings 241, 251 on the pole 201 are the equivalents of the windings 41, 51 on the pole 1 of the motor shown in FIG. 1 and the equivalents of the windings 81, 91 on one pole of the motor shown in FIG. 5.

Figure 11:
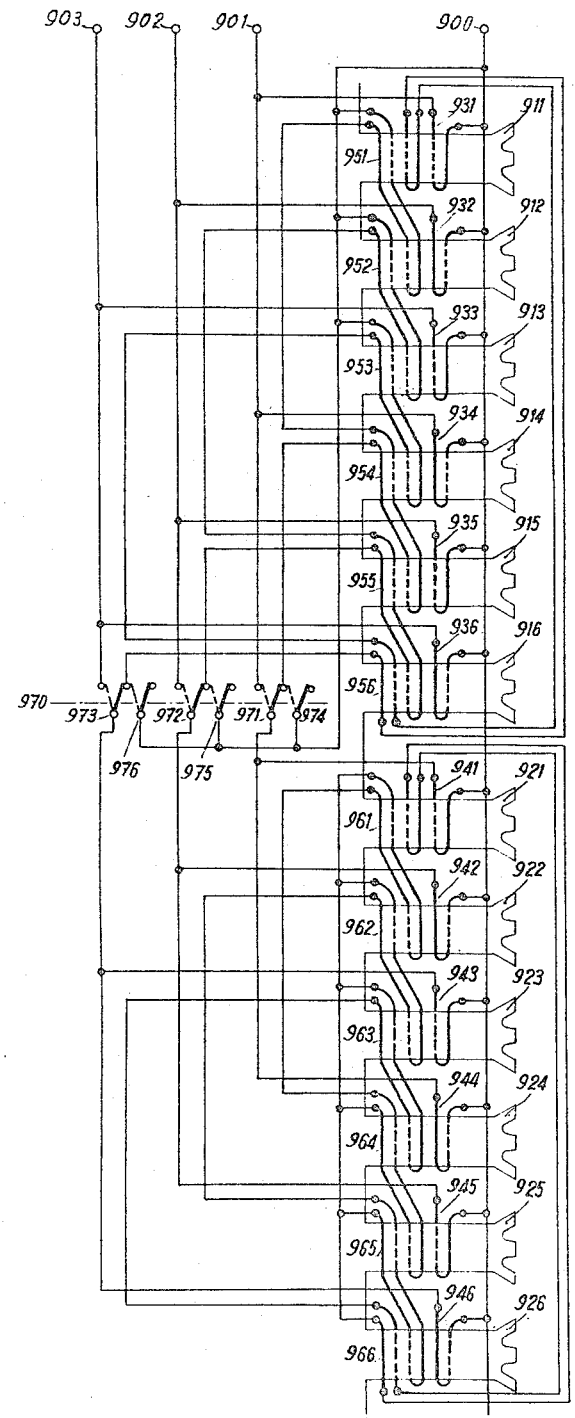
FIG. 11 shows a two-motor arrangement, the second motor forming a load for the induced voltage windings of the first motor.

FIG. 11 diagrammatically shows in developed form, two six-pole motors the rotors being omitted. The first motor has six poles 991–916 and the second motor has six poles 921–926. These two systems can be disposed either on a single group of laminations or on different groups. In the former case, the two pole systems act on a single rotor formed by a high-magnetic-permeability ring toothed internally as described with reference to FIG. 1, and in the second case there are two separated although identical motors. The poles have the teeth described with reference to FIG. 1. Terminals 900–903 are supplied respectively with the neutral and the three phases of the three-phase supply for the system.

The windings are shown by a single turn in solid line in front of the pole and in chain-line behind it. Windings 931–936 excite poles 911–916 with phase shifts of $\pi/3$ between consecutive poles. The latter windings are connected between the phase and the neutral but are wound alternately in opposite senses. For instance, the winding 931 is connected between the neutral 900 and the first phase 901 and is wound around the pole 911 in one sense, whereas the windings 932 is connected between the neutral 900 and the second phase 902 and extends around the pole 912 in the opposite sense. The induced voltage windings for this first pole system have the references 951–956 and extend as windings of opposite sense around two consecutive poles and are connected in series in pairs, as described in the exemplary winding in the opening part thereof. For instance, the winding 951 starts from the neutral 900, extends around the poles 911 and 912 in opposite directions, is in series with the winding 954 associated with the poles 914 and 915, and terminates at the three-phase changeover switch 970. The same can take up two positions, one of which is shown in solid line and the other in broken line. When the switch 970 is in the broken-line position, the induced voltage windings 951, 954 extend to the terminal 974 which is connected to the neutral, so that the induced voltage winding circuit 951–954 is short-circuited. Similarly, the induced voltage windings circuits 952–955 and 953–956 are short-circuited.

When the switch 970 is in the solid-line position, the induced voltage winding circuit 951–954 extends to the terminal 971 which acts in the same way for the second motor as does the terminal 901 for the first motor; current reaching the terminal 971 returns to the neutral through the field windings 941 and 944 which act similarly to the field windings 931 and 934. Similarly, the induced voltage winding circuits 952–955 and 953–956 extend respectively to terminals 972 and 973 which act on the second motor in the same way as do the terminals 902, 903 for the first motor.

To simplify the drawing, the second motor is shown with its induced voltage winding circuits 951–954, 952–

955, 953–956 short-circuited—i.e., in the state associated with the first motor when the switch 970 is in its broken-line position. The second motor is similar to the first and the reference number for its various parts have had ten added to the reference number of the corresponding part of the first motor. When the switch 970 is in the solid-line position, the two motors are in cascade, the induced voltage windings of the first supplying current to the field windings of the second. When the switch 970 is in the broken-line position, the two motors are connected in parallel with the induced voltage windings of both of them short-circuited. This kind of operation is very efficient when the motors approach the synchronous speed.

The wiring diagram of the second motor has to some extent been superimposed on the diagram of the first motor in order to make very clear how by further superimpositioning the diagram can be traced of a third motor connected to the second by a device similar to the switch 970, the third motor in turn being followed by a fourth motor and so on. Operation of the changeover switches helps to provide maximum efficiency in dependence upon the speed of motor rotation and can be performed automatically on the basis of motor speed measurement. The three-phase circuits shown in FIG. 11 are star-connected; clearly, they can be delta-connected without departing from the invention.

As stated in the opening part hereof, a number of cascade-connected motors can be synchronized by the last one being synchronized. To do this, a D.C. source is inserted in one of the induced voltage circuits of the final motor. For instance, in FIG. 11 the D.C. source is inserted in the induced voltage circuit formed by the serially connected windings 961 and 964. When a D.C. source is connected in this way into an induced voltage circuit of the final motor of a cascade-connected motor assembly, the assembly can operate as a generator. An external torque drives the rotor assembly at a frequency F, the final motor becomes an alternator, and the other motors of the system become frequency multipliers and power amplifiers. The mechanical power imparted to the rotor is converted into electrical power at a frequency $f_1 = ANF$.

Without departing from the scope of the invention, permanent magnetisation can be used instead of the D.C. polarizing. For instance, it has been seen, in the case of synchronous operation of the systems shown in FIGS. 1 and 4, that a D.C. which magnetizes the rotor teeth flows through the induced voltage windings; the toothed rotor can be replaced by a non-salient pole permanently magnetized rotor having a North pole instead of the tooth and a South pole instead of a tooth space.

What I claim is:
1. Slow speed electric motor comprising a completely unwound rotor provided with N equiangularly spaced teeth, a stator having M spatial electric periods around its circumference and P poles per spatial period, each pole of which being provided with teeth having substantially the same angular spacing as the rotor teeth, the numbers M, N and P being interrelated by the relationship: $N/M = kP \pm 1$ ($k$ being an integer), field windings around said poles, means for energizing said windings with an alternating current and a between-poles phase-shift increment of $\varphi_1$, induced voltage windings around said poles, means for having this induced voltage windings induced by said field windings with a between-poles phase-shift increment of $\varphi_2$ wherein $P\varphi_1$ is a first multiple of $2\pi$ and $P\varphi_2$ is a second multiple of $2\pi$ differing from the first multiple by one and terminating impedances for said induced voltage windings.

2. Slow speed electric motor comprising a completely unwound rotor provided with N equiangularly spaced teeth, a stator having M spatial electric periods around its circumference and P poles per spatial period, each pole of which being provided with teeth having substantially the same angular spacing as the rotor teeth, the numbers M, N and P being interrelated by the relationship: $N/M = kP \pm 1$ ($k$ being an integer), field windings around said poles, means for energizing said windings with an alternating current and a between-poles phase-shift increment of $\varphi_1$, serially connected induced voltage windings alternately wound in a direction and in the other direction around successive poles whereby the between-poles phase-shift increment $\varphi_2$ is equal to $\pi$, wherein P is a first even integer and $P\varphi_1/\pi$ is a second even integer differing from the first integer by two and a terminating impedance for said serially connected induced voltage windings.

3. Slow speed electric motor comprising a completely unwound rotor provided with N equiangularly spaced teeth, a stator having M spatial electric periods around its circumference and P poles per spatial period, each pole being provided with teeth having substantially the same angular spacing as the rotor teeth, the numbers M, N and P being interrelated by the relationship: $N/M = kP \pm 1$ ($k$ being an integer), field windings around said poles, means for energizing said windings with an alternating current and a between-poles phase-shift increment of $\varphi_1$, induced voltage windings around said poles, means for having this induced voltage windings induced by said field windings with a between-poles phase-shift increment of $\varphi_2$ wherein $P\varphi_1$ is a first multiple of $2\pi$ and $P\varphi_2$ is a second multiple of $2\pi$ differing from the first multiple by one, said induced voltage windings being wound with two wires, the first wire forming around the pole of order $q$ ($q = 0, 1, 2 \ldots (P-1)$) a number of turns proportional to $\cos q\varphi_2$ and being wound in a sense corresponding to the sign of $\cos q\varphi_2$, the second wire forming around the pole of order $q$ a number of turns proportional to $\sin q\varphi_2$ and being wound in a sense corresponding to the sign of $\sin q\varphi_2$, and terminating impedances for said induced voltage windings.

4. Slow speed electric motor according to claim 1 wherein said terminating impedances are short-circuits.

5. Slow speed electric motor according to claim 2 wherein said terminating impedance is a short-circuit.

References Cited

UNITED STATES PATENTS

| | | | |
|---|---|---|---|
| 1,959,449 | 5/1934 | Stoller | 310—163 |
| 2,295,286 | 9/1942 | Michelsen | 310—163 |
| 2,982,872 | 5/1961 | Frederickson | 310—163 |
| 3,280,398 | 10/1966 | Marie | 318—166 |

ORIS L. RADER, *Primary Examiner.*

G. Z. RUBINSON, *Assistant Examiner.*